United States Patent [19]

Skopil

[11] Patent Number: 4,981,114
[45] Date of Patent: Jan. 1, 1991

[54] STRATIFIED CHARGE INTERNAL COMBUSTION ENGINE

[76] Inventor: Arnold O. Skopil, 216 N. K St., Aberdeen, Wash. 98520

[21] Appl. No.: 470,895

[22] Filed: Jan. 26, 1990

[51] Int. Cl.⁵ .............................................. F02B 33/08
[52] U.S. Cl. ........................... 123/51 AA; 123/51 BA; 123/57 R
[58] Field of Search ............. 123/51 A, 51 AA, 51 B, 123/51 BA, 57 R, 57 A, 57 B, 48 A, 78 A, 51 R

[56] References Cited

U.S. PATENT DOCUMENTS

| | | | |
|---|---|---|---|
| 806,195 | 12/1905 | De Sanderval . | |
| 2,137,941 | 11/1938 | Helmore et al. | 123/51 A |
| 2,415,506 | 2/1947 | Mallory | 123/53 A |
| 2,442,082 | 5/1948 | French | 123/51 B |
| 2,937,630 | 5/1960 | Norton | 123/51 AA |
| 3,446,192 | 5/1969 | Woodward | 123/51 A |
| 4,104,995 | 8/1978 | Steinbock | 123/51 AA |
| 4,170,970 | 10/1979 | McCandless | 123/51 BA |
| 4,275,689 | 6/1981 | Ray | 123/65 A |
| 4,312,308 | 1/1982 | Slattery | 123/65 A |

FOREIGN PATENT DOCUMENTS

| | | | |
|---|---|---|---|
| 0030832 | 6/1981 | European Pat. Off. | 123/51 B |
| 458854 | 11/1924 | Fed. Rep. of Germany | 123/51 A |
| 2245417 | 3/1974 | Fed. Rep. of Germany | 123/73 C |
| 0220658 | 4/1985 | German Democratic Rep. | 123/73 C |
| 0101229 | 6/1985 | Japan | 123/51 A |

Primary Examiner—David A. Okonsky
Attorney, Agent, or Firm—Delbert J. Barnard

[57] ABSTRACT

Each main cylinder (10) of an internal combustion engine is provided with a smaller idle cylinder (12). Pistons (14, 20) in the cylinders (10, 12) are operated substantially in unison and are driven by crank shafts (18, 24) which are mechanically connected (26). A fuel air charge is compressed within the idle cylinder (12). Then, it is ignited within an ignition passageway (60). The ignited mixture is injected into a center region of the combustion chamber (58) of the main cylinder (10). A relatively lean fuel-air mixture is delivered by a duct (54) into the combustion chamber (58) as a swirling stream. Air alone is delivered by duct (56) into the combustion chamber around the swirling fuel-air stream from duct (54). The ignited gases from passageway (60) ignites the fuel air mixture in combustion chamber (58). The volume of the idle cylinder (12) is sized to take in and compress only the volume of fuel-air mixture which is needed to produce the power for idling and in addition produce a high enough temperature to ignite the relatively lean fuel air mixture that is separately introduced into the combustion chamber (58) of the main cylinder (10).

10 Claims, 1 Drawing Sheet

STRATIFIED CHARGE INTERNAL COMBUSTION ENGINE

DESCRIPTION

1. Technical Field

The present invention relates to internal combustion engines. More particularly, it relates to the provision of a stratified charge internal combustion engine constructed to operate at a high compression ratio throughout its entire power range without a need to throttle the air intake.

2. Background Information

Conventional internal combustion engines comprise one or more cylinders, and a piston within each cylinder. The pistons are connected to a crank shaft. The cylinders include intake and exhaust valves. A fuel/air charge is delivered into each cylinder. The charge is compressed. The compressed charge is then ignited, causing it to explode and exert a driving force on the piston. The driving force is transmitted to the drive shaft. A principal object of the present invention is to provide such an engine in which each main cylinder is associated with a smaller idle cylinder which has only enough volume to take in the combustible charge needed to produce the power required for idling. Another object is to produce such an engine in which the ignited charge of the idle cylinder is used to ignite a leaner combustible charge in the combustion chamber of the main cylinder. A further object of the invention is to provide such an engine in which a stratified charge is delivered into the combustion chamber of the main cylinder. The stratified charge is richer near the center of the cylinder than adjacent the sidewalls of the cylinder.

DISCLOSURE OF THE INVENTION

The internal combustion engine of the present invention is basically characterized by one or more main cylinders and a smaller idle cylinder associated with each main cylinder. A main piston is located within each main cylinder and a combustible charge is delivered into each main cylinder. An idle piston is provided within each idle cylinder. A separate combustible charge is delivered into each idle cylinder. An ignition passageway leads from each idle cylinder to the associated main cylinder. An ignition device is located within each ignition passageway. The compressed charge in the idle cylinder is delivered into the ignition passageway and is ignited in the passageway. This ignited charge then enters into the main cylinder and ignites the compressed main charge that is within the main cylinder.

According to an aspect of the invention, an intake passageway is associated with each idle cylinder. The intake passageway has an air inlet and a combustible charge outlet. The combustible charge outlet communicates with the idle cylinder. A fuel injector is positioned to inject fuel into air within the intake passageway. An intake valve is positioned between the intake passageway and the idle cylinder. The intake valve is opened during retraction of the idle piston and is closed during extension of the idle piston. A throttle valve is preferably provided in the intake passageway for controlling the volume of air used to form a charge.

According to another aspect of the invention, each main cylinder is provided with a charge delivery duct having an air inlet and a charge delivery outlet. The charge delivery outlet communicates with the combustion chamber of the main cylinder. A fuel injector is located in the charge delivery duct and serves to inject fuel into air within the duct. An intake valve is positioned between the charge delivery outlet and the combustion chamber of the main cylinder. This intake valve is opened during retraction of the main piston and is closed during extension of the main piston.

According to a further aspect of the invention, the charge delivery duct is positioned to discharge substantially tangentially into the main cylinder, to cause each charge to swirl as it enters the combustion chamber. Preferably, the ignition passageway is positioned to discharge into a center region of the combustion chamber and into the center of the swirling main charge. According to a further aspect of the invention, air alone is separately introduced into the combustion chamber of the main cylinder in a swirling pattern around the swirling main charge.

The use of a smaller idle cylinder with each main cylinder permits operation of the engine at a high compression ratio throughout its entire power range, from low power idling up to high power full throttle operation of the engine. The engine of the invention is very efficient. Its fuel consumption is low. It can be run on cheaper, less refined fuels than conventional engines without the occurrence of engine knock.

BRIEF DESCRIPTION OF DRAWING

In the drawings, like reference numerals are used throughout the various views of the drawings, and.

BEST MODE FOR CARRYING OUT THE INVENTION

Figures 1, 2:
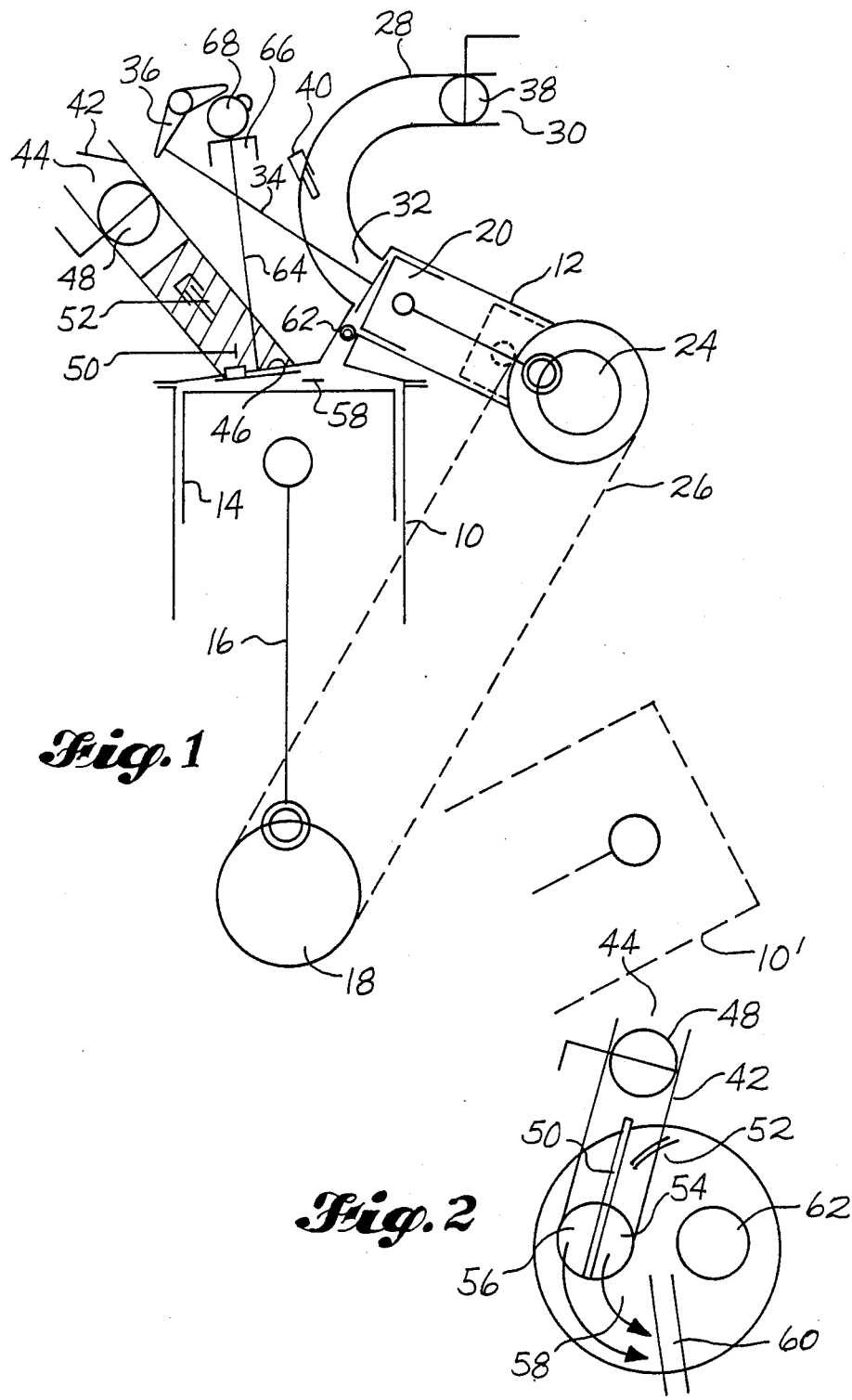
FIG. 1 is a structural schematic diagram of an engine constructed according to the present invention, showing a single main cylinder and its associated idle cylinder, and further indicating by broken line the possible presence of additional cylinders.
FIG. 2 is a diagram looking generally down into the top of the combustion chamber of a main cylinder, showing a preferred pattern of delivery of a stratified charge into the combustion chamber of the main cylinder.

Referring to FIG. 1, a main engine cylinder 10 is shown to be associated with a smaller idle cylinder 12. The main cylinder 10 includes a main piston 14 which includes a piston rod 18 extending down to a connection with a crank shaft 16. In similar fashion, the idle cylinder 12 is provided with an idle piston 20 having a piston rod connecting it to an auxiliary shaft 24 that is coupled by a suitable drive transmission 26 to the crank shaft 18. A second main cylinder 10 is indicated in FIG. 1 by broken lines. It is to be understood that the number of main cylinders is a variable, but according to the invention each main cylinder that is used has associated with it a separate idle cylinder 12. The present invention relates to the provision of an idle cylinder 12 for each main cylinder 10 and not to any particular number of cylinders within an engine. For that reason, only a single main cylinder 10 and its associated idle cylinder 12 are being disclosed.

According to an aspect of the invention, each idle cylinder 12 is provided with a charge passageway 28 having an air inlet 30 and a combustible charge outlet 32. The combustible charge outlet 32 communicates with the idle cylinder 12, generally opposite the upper end of the idle piston 20. Idle cylinder 12 includes an intake valve 34 positioned to open and close the charge delivery outlet 32. The outer end of the valve 34 contacts and is controlled by a rocker arm 36. Preferably, a throttle valve 38 is provided in the charge delivery passageway 28. Also, a fuel injector 40 is positioned to inject fuel into the passageway 28 to be mixed with the air in such passageway so as to form a combustible fuel/air mixture or charge.

The main cylinder 10 is provided with means for delivering into it a combustible fuel/air mixture. This means preferably comprises a tube 42 having an air inlet 44 and an outlet 46. Preferably, a throttle valve 48 is located within the tube 42. Preferably also, the tube 42 is longitudinally divided by a center wall 50 downstream of the throttle valve 48. Preferably also, a fuel injector 52 is positioned to discharge fuel into the inside duct 54. Air alone flows through the outside duct 56. As shown by FIG. 2, both the fuel/air stream from duct 54 and the air only stream from duct 56 enter into the combustion chamber 58 of main cylinder 10 at a tangent, so that each stream will swirl around the combustion chamber 58. This provides the combustion chamber 58 with a swirling charge having a relatively richer inner portion and a leaner outer portion.

Referring back to FIG. 1, an ignition passageway 60 extends from idle cylinder 12 to a central location of the combustion chamber 58. An ignition device, such as a spark plug 62, is located within the ignition passageway 60.

In operation, air is drawn into the charge passageway 28. Fuel is injected into the air and the fuel/air mixture is pulled into the idle cylinder 12 during the retraction stroke of piston 20. Then, when the piston 20 extends, it compresses the charge. The compressed charge is ignited by the igniter 62, and the burning gases are discharged from passageway 60 into the combustion chamber 58. The idle cylinder 12 is sized to take in only the fuel-air mixture that is needed to (1) produce the power required for idling, and (2) the temperature required to ignite the leaner charge that has been separately delivered into the combustion chamber 58.

The intake valve 64 and the outlet valve for the main cylinder 10 may be conventional intake/exhaust valves. The orientation of the delivery tube 42 is a part of the invention. This tube 42 is directed, and the intake valve 64 is shrouded, in a manner to cause the lean fuel/air mixture from duct 54 and the air from duct 56 to swirl around the combustion chamber 58, in the manner described. This swirl provides turbulence for mixing but even though mixing occurs there is a richer fuel/air mixture near the center of the combustion chamber 58 than on the outside. This is because the fuel is injected into the inner duct 54 and air alone is introduced through the outer duct 56. The fuel/air mixture starts close to the center of the combustion chamber 58. Thus, even though there is mixing between the fuel airstream from duct 54 and the airstream from duct 56, the separation which was made upstream of the outlet 56 results in there always being a relatively greater amount of fuel near the center of the chamber 58 than there is adjacent the sidewalls of the chamber 58.

The main cylinder 10 is provided with an inlet valve 64 which includes a valve rod 66 which extends up to a mechanism 68 which opens and closes the valve 64 at the proper time.

During operation, the throttle valves 38 and 48 are usually both fully open. This is contrary to the present practice with conventional engines. Throttle valve 38 may have to be closed slightly only to balance the pressures in the two cylinders 10, 12. The air entering the idle cylinder 12 is preferably preheated for better fuel evaporation and easier ignition. This heating may be done in a heat exchanger in which the air is passed into indirect heat exchange with waste heat, e.g. exhaust gases. Preferably the air is heated to provide better fuel evaporation and easier ignition. Preheating the air provides heat-recirculation, resulting in fuel saving. The air supplied to the main cylinder 10 can also be preheated for warm-up only. Fuel injectors 40 and 52 may be conventional injectors and the supply of fuel and operation of the injectors may be conventional. Simple needle valves can be used for metering of fuel. The electrical ignition system may be conventional. The connection of the main shaft 18 to the shaft 24 of the idle cylinder 12 may be by use of conventional gears or other drive transmission means. The injectors 40, 52 can be supplied with a wide variety of existing fuels.

The following is a description of a four-stroke operation: Preheated air is delivered into passageway 28 and in passageway 28 is mixed with an easily ignitable fuel, such as regular gasoline, supplied by the injector 40. The resulting fuel air mixture is delivered through inlet 32 during the intake stroke of the cylinder 12. Since the pistons 14 and 20 work in unison, or are only slightly offset in relation to top dead center, at the same time air also passes through inlet 46 into the main cylinder 10. Throttle valve 38 is set to keep a substantially even vacuum between the two cylinders 10, 12. After compression and ignition of the easily ignitable fuel-air mixture by the spark plug 62, the burning expanding gases flow from passageway 60 into the combustion chamber 58 and mix with the swirling air that has entered or is entering the combustion chamber 58. The burning fuel-air mixture also ignites any additional fuel supplied by injector 52, for increased power. This manner of supplying the fuel and air, and the mixing which incurs, enhances clean burning inside the main cylinder 10, as opposed to afterburning by injecting air into the exhaust manifold and/or a catalytic converter. The use of afterburning constitutes a waste of energy. The delivery of the fuel by injector 52 into the inner duct 54, in a manner causing the resulting fuel air mixture to swirl near the center of the combustion chamber 58, together with the introduction of swirling air only through duct 56, results in combustion without detonation or "knocking." The amount of fuel supply can be regulated to keep the gases in combustion chamber at a desired level for NOX control. Both throttle valves 38, 48 can be closed together, and the fuel supply shut off, for braking, if the engine is used in a motor vehicle.

A single divided tube 42 is illustrated for providing the fuel/air mixture duct 54 and the air only duct 56, and the two ducts 54, 56 are shown to be controlled by a single intake valve 64. However, it is to be understood that in other embodiments, completely separate tubes can be used, in place of a divided single tube, with each tube being provided with a separate valve. The use of completely separate tubes will permit their separate placement and could result in better control over the swirl pattern and fuel stratification inside of the combustion chamber. Also, the size of the idle cylinder 12 can be varied, depending on engine size, the purpose of the engine, and whether or not the engine is supercharged. A lower compression ratio will require a larger idle cylinder and a higher compression ratio will require a smaller idle cylinder. This is because of the respective compression temperatures for efficient operation.

The relationships that have been described are for an engine in which maximum efficiency is desired. It is to be understood that changes may be made, both the changes that have been mentioned and others, without altering the basic concept of the invention. The object of the invention is to produce an easily ignitable fuel-air mixture in a smaller cylinder and use the created heat in combination with the heat produced by compression in both cylinders to ignite a leaner mixture of fuel and air that is swirled into a larger combustion chamber. As previously stated, the air introduced into the idle cylinder can be preheated and this will result in a higher compression end-temperature in the idle cylinder.

The invention can also be incorporated into a two-stroke engine.

The embodiment that has been illustrated and described has been presented for purposes of making it easier to understand the invention. The scope of protection is not to be limited by the disclosed embodiment. Rather, the scope of protection is to be determined by the appended claims, interpreted in accordance with the established rules of patent claim interpretation, including use of the doctrine of equivalents.

What is claimed:

1. An internal combustion engine, comprising:
   a main cylinder, a main piston within said main cylinder, and means for delivering a combustible charge into said main cylinder;
   a smaller idle cylinder, an idle piston within said idle cylinder, and means for delivering a combustible charge into said idle cylinder;
   an ignition passageway leading from said idle cylinder to said main cylinder; and
   an ignition device within said ignition passageway operable to ignite a compressed charge discharged by the idle cylinder into said ignition passageway, said passageway being positioned to discharge the ignited compressed charge from the idle cylinder into the main cylinder to ignite the compressed charge within the main cylinder.

2. An internal combustion engine according to claim 1, comprising an intake passageway for the idle cylinder, said intake passageway having an air inlet and a combustible charge outlet, said combustible charge outlet communicating with the idle cylinder, a fuel injector positioned to inject fuel into air within the intake passageway, and an intake valve positioned between the intake passageway and the idle cylinder, said intake valve being opened during retraction of the idle piston and being closed during extension of the idle piston.

3. An internal combustion engine according to claim 2, comprising a throttle valve in the intake passageway.

4. An internal combustion engine according to claim 1, comprising a charge delivery duct for delivering a combustible charge into the main cylinder, said charge delivery duct having an air inlet and a charge delivery outlet communicating with the main cylinder, and a fuel injector in said charge delivery duct, for injecting fuel into air within said duct, and an intake valve positioned between said charge delivery duct and the main cylinder, said intake valve being opened during retraction of the main piston and being closed during extension of the main piston.

5. An internal combustion engine according to claim 4, wherein said charge delivery duct is positioned to discharge substantially tangentially into the main cylinder.

6. An internal combustion engine according to claim 5, comprising a second charge duct leading into the main cylinder, said second charge duct being positioned radially outwardly of the first charge duct and also being positioned to discharge its charge substantially tangentially into the main cylinder.

7. An internal combustion engine according to claim 5, wherein said ignition passageway is positioned to deliver the ignited compressed charge from the idle cylinder into a central portion of the main cylinder, and the charge delivery duct for the main cylinder is positioned to discharge its charge along a swirling path which surrounds the entry location of the ignited charge.

8. An internal combustion engine according to claim 7, comprising a second charge duct leading into the main cylinder, said second charge duct being positioned radially outwardly of the first charge duct and also being positioned to discharge substantially tangentially into the main cylinder, along a swirling path surrounding the swirling path of the charge delivered by the first charge delivery duct.

9. An internal combustion engine according to claim 8, wherein the charge delivered by the second charge duct is substantially air and the charge delivered by the first charge duct is a relatively lean mixture of fuel and air, and the fuel air mixture delivered by the idle cylinder into the ignition passageway is richer than the charge delivered by the first charge duct into the main cylinder.

10. An internal combustion engine according to claim 6, comprising a single tube divided by a wall, wherein the first charge duct is a passageway in the tube on a first side of the wall and the second charge duct is a passageway in the tube on the second side of the wall.

* * * * *